US012748531B2

(12) United States Patent
Byron et al.

(10) Patent No.: US 12,748,531 B2
(45) Date of Patent: Sep. 29, 2026

(54) INCREMENTAL POWER THROTTLING ON MEMORY SYSTEM

(71) Applicant: Micron Technology, Inc., Boise, ID (US)

(72) Inventors: Brent Carl Byron, Boise, ID (US); Suresh Rajgopal, San Diego, CA (US); Shakeel Bukhari, San Jose, CA (US); Jeonghun Kim, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 6 days.

(21) Appl. No.: 18/937,737

(22) Filed: Nov. 5, 2024

(65) Prior Publication Data

US 2025/0147669 A1 May 8, 2025

Related U.S. Application Data

(60) Provisional application No. 63/547,627, filed on Nov. 7, 2023.

(51) Int. Cl.
*G06F 3/06* (2006.01)

(52) U.S. Cl.
CPC .......... *G06F 3/0613* (2013.01); *G06F 3/0625* (2013.01); *G06F 3/0653* (2013.01); *G06F 3/0659* (2013.01); *G06F 3/0679* (2013.01)

(58) Field of Classification Search
CPC .... G06F 3/0613; G06F 3/0625; G06F 3/0653; G06F 3/0659; G06F 3/0679
See application file for complete search history.

(56) References Cited

U.S. PATENT DOCUMENTS

| | | | | |
|---|---|---|---|---|
| 9,417,684 B2 * | 8/2016 | Ramage | ................ | G06F 1/3275 |
| 10,248,327 B2 | 4/2019 | Kryvaltsevich | | |
| 2013/0198451 A1 * | 8/2013 | Hyun | .................... | G06F 3/0652 711/155 |
| 2013/0205085 A1 * | 8/2013 | Hyun | .................... | G06F 3/0679 710/5 |
| 2016/0320995 A1 | 11/2016 | Warriner | | |
| 2019/0243577 A1 * | 8/2019 | Pelster | .................. | G06F 3/0659 |
| 2021/0200481 A1 * | 7/2021 | Buxton | ................. | G06F 9/4418 |
| 2023/0111732 A1 | 4/2023 | Kim et al. | | |
| 2023/0131347 A1 | 4/2023 | Guan et al. | | |
| 2023/0350584 A1 * | 11/2023 | Desai | .................... | G06F 3/0659 |

FOREIGN PATENT DOCUMENTS

WO 2025101488 A1 5/2025

OTHER PUBLICATIONS

Cebrián, Juan M., et al. "Managing power constraints in a single-core scenario through power tokens." The Journal of Supercomputing 68.1 (2014): 414-442. (Year: 2014).*

(Continued)

*Primary Examiner* — Nicholas J Simonetti
(74) *Attorney, Agent, or Firm* — Schwegman Lundberg & Woessner, P.A.

(57) ABSTRACT

Various embodiments provide for incremental power throttling on a memory system, such as a memory sub-system. In particular, for some embodiments, incremental power throttling is implemented on a memory system using one or more power credit allocations and memory operation progress tracking.

20 Claims, 5 Drawing Sheets

(56) References Cited

OTHER PUBLICATIONS

Zhou, Ping, et al. "Throughput enhancement for phase change memories." IEEE Transactions on Computers 63.8 (2013): 2080-2093. (Year: 2013).*
"International Application Serial No. PCT US2024 054524, International Search Report mailed Feb. 21, 2025", 3 pages.
"International Application Serial No. PCT US2024 054524, Written Opinion mailed Feb. 21, 2025", 5 pages.

* cited by examiner

INCREMENTAL POWER THROTTLING ON MEMORY SYSTEM

PRIORITY APPLICATION

This application claims the benefit of priority to U.S. Provisional Application Ser. No. 63/547,627, filed Nov. 7, 2023, which is incorporated herein by reference in its entirety.

TECHNICAL FIELD

Example embodiments of the disclosure relate generally to memory devices and, more specifically, to incremental power throttling on a memory system, such as a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
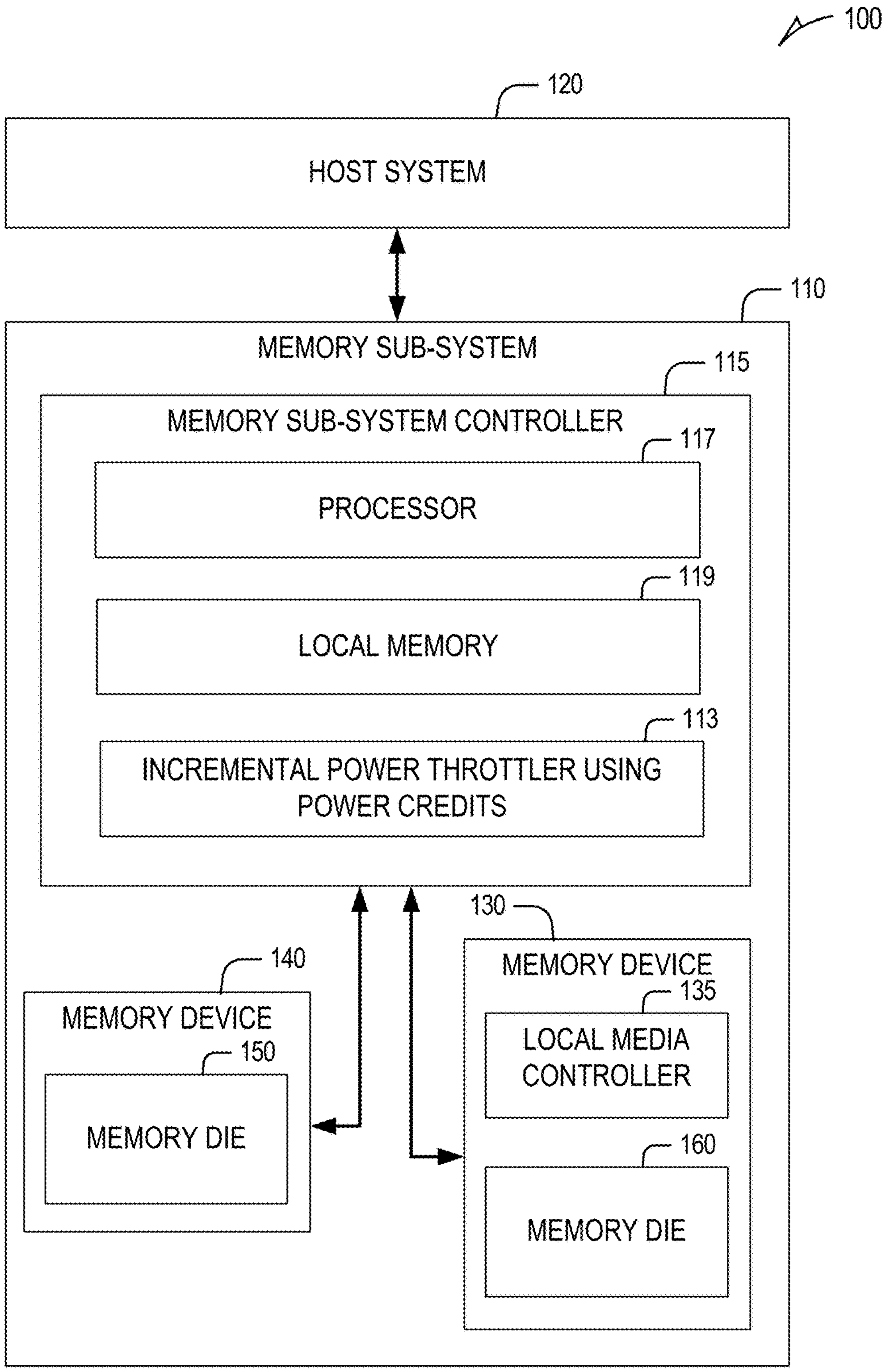
FIG. 1 is a block diagram illustrating an example computing system that includes a memory sub-system, in accordance with some embodiments of the present disclosure.

Aspects of the present disclosure are directed to incremental power throttling on a memory system, such as a memory sub-system, using one or more power credit allocations and memory operation progress tracking. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write commands, read commands) to the memory sub-system, such as to store data on a memory device at the memory sub-system, read data from the memory device on the memory sub-system, or write/read constructs with respect to a memory device on the memory sub-system. The data to be read or written, as specified by a host request (e.g., data access request or command request), is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation on host data that is stored on a memory device or a scan (e.g., media scan) of one or more blocks of a memory device. For example, firmware of the memory sub-system can re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can comprise one or more planes. For some types of non-volatile memory devices (e.g., NOT-AND (NAND)-type devices), each plane comprises a set of physical blocks. For some memory devices, blocks are the smallest area that can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

Generally, writing data to such memory devices involves programming (by way of a program operation) the memory devices at the page level of a block, and erasing data from such memory devices involves erasing the memory devices at the block level (e.g., page level erasure of data is not possible). Certain memory devices, such as NAND-type memory devices, comprise one or more blocks, (e.g., multiple blocks) with each of those blocks comprising multiple pages, where each page comprises a subset of memory cells of the block, and where a single wordline of a block (which connects a group of memory cells of the block together) defines one or more pages of a block (depending on the type of memory cell). Depending on the embodiment, different blocks can comprise different types of memory cells. For instance, a block (a single-level cell (SLC) block) can comprise multiple SLCs, a block (a multi-level cell (MLC) block) can comprise multiple MLCs, a block (a triple-level cell (TLC) block) can comprise multiple TLCs, and a block (a quad-level cell (QLC) block) can comprise QLCs. Other blocks comprising other types of memory cells (e.g., higher-level memory cells, having higher bit storage-per-cell) are also possible.

Each worldline (of a block) can define one or more pages depending on the type of memory cells (of the block) connected to the wordline. For example, for an SLC block, a single wordline can define a single page. For a MLC block, a single wordline can define two pages-a lower page (LP) and an upper page (UP). For a TLC block, a single wordline can define three pages-a lower page (LP), an upper page (UP), and an extra page (XP). For a QLC block, a single wordline can define four pages-a lower page (LP), an upper page (UP), an extra page (XP), and a top page (TP) page. As used herein, a page of LP page type can be referred to as a "LP page," a page of UP page type can be referred to as a "UP page," a page of XP page type can be referred to as a "XP page," and a page of TP page type can be referred to as a "TP page." Each page type can represent a different level of a cell (e.g., QLC can have a first level for LPs, a second level for UPs, a third level for XPs, and a fourth level for TPs). To write data to a given page, the given page is programmed according to a page programming algorithm (e.g., that causes one or more voltage pulses or pulses to memory cells of a block based on the memory).

In conventional memory systems (e.g., memory sub-systems), one method of controlling power usage is to assign (e.g., associate) an amount of power credits to each type of memory operation (e.g., memory media operation) performed on the memory systems. For instance, when a memory operation is initiated, power credits allocated to (e.g., assigned to or checked out for) the memory operation are withdrawn from a pool of total power credits allocated to a memory system. Different types of memory operations (e.g., write operation, read operation, program, and erase operations) can have different amounts of power credit allocated to them (e.g., read operation allocated less power credit than a write operation). While the pool of credits is depleted, no new memory operations can be submitted or processed. In certain memory devices (e.g., NAND-type memory devices), some memory operations can be suspended temporarily to service another command, which can improve latency for targeted memory operations. During a memory operation pause, power credits allocated to the paused memory operation can be placed back into the power credit pool, thereby allowing one or more other memory operations to use them. Given that some memory operations can be completed in parts or can be paused temporarily to permit one or more other operations (e.g., media operations) to be performed, allocating (e.g., pulling) a specified amount of power credit each time a memory operation is resumed (regardless of how much the memory operation has been completed) is not efficient use of power budget provided by a power credit pool.

According to some embodiments, a memory system, such as a memory sub-system, implements incremental power throttling on the memory system using one or more power credit allocations and memory operation progress tracking (e.g., monitoring). In particular, some embodiments use power credit allocation from a power credit pool of a memory system for a memory operation (e.g., memory media operation), enable pausing and resuming of the memory operation, track memory operation (e.g., memory media operation) progress, and decrement the amount of power credits allocated to the memory operation upon next resume or to a next segment of the memory operation.

For some embodiments, a memory operation (that is paused and resumed as described herein) comprises at least one of a program operation or an erase operation, and determine progress of the memory operation (e.g., how much of the memory operation is completed) using one or more counters to track the number of pulses performed (e.g., program pulses or erase pulses on memory cells of a NAND-type memory device) or tracking (e.g., monitoring) an amount of time elapsed (e.g., completed) prior to the memory operation being paused. Depending on the embodiment, a current and timing profiling can be determined (e.g., generated) in order to determine an amount of power budget or length of time for each program/erase pulse. Additionally, an embodiment can use a program status check timer to determine (e.g., know) how much of a program operation has already completed. Each time a program operation or an erase operation resumes, a smaller number of power credits are allocated to the program/erase operation based on the previously completed pulses or percentage of the total expected time.

For some embodiments, a memory operation (that is paused and resumed as described herein) comprises a read operation (e.g., media read operation), and separate power credit amounts can be allocated for a media array read portion of the read operation and for a data portion of the read operation. For some embodiments, a current profiling is used to determine the amount of power budget used by each portion (e.g., the media array read and transfer portions) of the read operation. According to some embodiments, if read data is cached on the memory system, but not yet transferred across the interface (e.g., an interface based on an Open NAND Flash Interface specification) between the memory system and a host system, the power credits allocated to the media array read portion of the read operation can be released for other operations. Thereafter, a smaller amount of power credits can be checked out for the data transfer portion of the read operation when the read data (now cached on the memory system) is requested by the host system.

For some embodiments, a memory operation (that is paused and resumed as described herein) comprises a write operation (e.g., media write operation), and separate power credit amounts can be allocated for transferring data from different types of pages of a wordline of a block of a NAND-type memory device. For example, with respect to a MLC block, separate power credit amounts can be allocated for a first portion of the write operation to transfer (e.g., write) data to one or more lower pages (LPs) of the MLC block, and a second portion of the write operation to transfer data to one or more upper pages (UPs) of the MLC block. With respect to a TLC block, separate power credit amounts can be allocated for a first portion of the write operation to transfer (e.g., write) data to one or more lower pages (LPs) of the TLC block, a second portion of the write operation to transfer data to one or more upper pages (UPs) of the TLC block, and a third portion of the write operation to transfer data to one or more extra pages (EPs) of the TLC block. With respect to a QLC block, separate power credit amounts can be allocated for a first portion of the write operation to transfer (e.g., write) data to one or more lower pages (LPs) of the QLC block, a second portion of the write operation to transfer data to one or more upper pages (UPs) of the QLC block, a third portion of the write operation to transfer data to one or more extra pages (EPs) of the QLC block, and a fourth portion of the write operation to transfer data to one or more top pages (TPs) of the QLC block. Additionally, the separate power credits allocated to an individual portion of the write operation (e.g., portion associated with UPs of a block) can be further divided such that separate power credits are allocated for a sub-portion associated with a page transfer operation and for a sub-portion associated with a media array operation. For some embodiments, the power credits are released after (e.g., immediately or soon after) a portion or sub-portion of the write operation completes.

Use of various embodiments increases (e.g., maximizes) a number of free power credits at any given time to permit more memory operations (e.g., memory media operations) to be processed within a same power budget (in comparison to conventional power-credit techniques). Use of various embodiments reduces latency outliers and improves throughput and consistency of performance of a memory system. For instance, large credit memory operations can block small credit memory operations unnecessarily and create latency outliers. Latency outliers caused by memory operations (e.g., memory media operations), waiting for enough power credits to be available in a power credit pool, can be minimized by some embodiment. Additionally, finer granularity of power credits can be enabled by various embodiments. Further, with large granularity power credits provided by various embodiments, throughput can be maximized in mixed operation workloads when power limiting is in force. Some embodiments improve performance and power consistency in workloads that use a full power budget.

As used herein, a host command can comprise a data write request or data read request received from a host system to be performed on one or more blocks or pages of a memory device in response to the request (e.g., write request or read request). The request can comprise one or more memory addresses and other parameters that specify the one or more blocks or pages on which the request is to be performed. As used herein, a memory media operation (or media operation) can comprise an operation that is sent (e.g., by a memory sub-system controller) to a memory media (e.g., send to local media controller managing the volatile or non-volatile memory media) of a memory device for execution with respect to the memory media (e.g., NAND-type memory media). For various embodiments, a host command is received by a memory system controller (e.g., memory sub-system controller) from a host system and one or more memory media operations are generated to facilitate performance of the host command with respect to memory media of the memory system. In this way, memory media operations of a memory system can be considered backend memory operations executed with respect to memory media of the memory system.

Disclosed herein are some examples of incremental power throttling on a memory system using one or more power credit allocations and memory operation progress, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple or fractional bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands, requests, or operations from the host system 120 and can convert the commands, requests, or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

Each of the memory devices 130, 140 include a memory die 150, 160. For some embodiments, each of the memory devices 130, 140 represents a memory device that comprises a printed circuit board, upon which its respective memory die 150, 160 is solder mounted.

The memory sub-system controller 115 includes an incremental power throttler using one or more power credits 113 (hereafter, the incremental power throttler 113) that enables or facilitates the memory sub-system controller 115 to incrementally throttle power on the memory sub-system 110 using one or more power credit allocations and memory operation progress tracking as described herein. Some or all of the incremental power throttler 113 is included by the local media controller 135 to facilitate the implementation of incremental power throttling on the memory sub-system 110 as described herein.

Figure 2A:
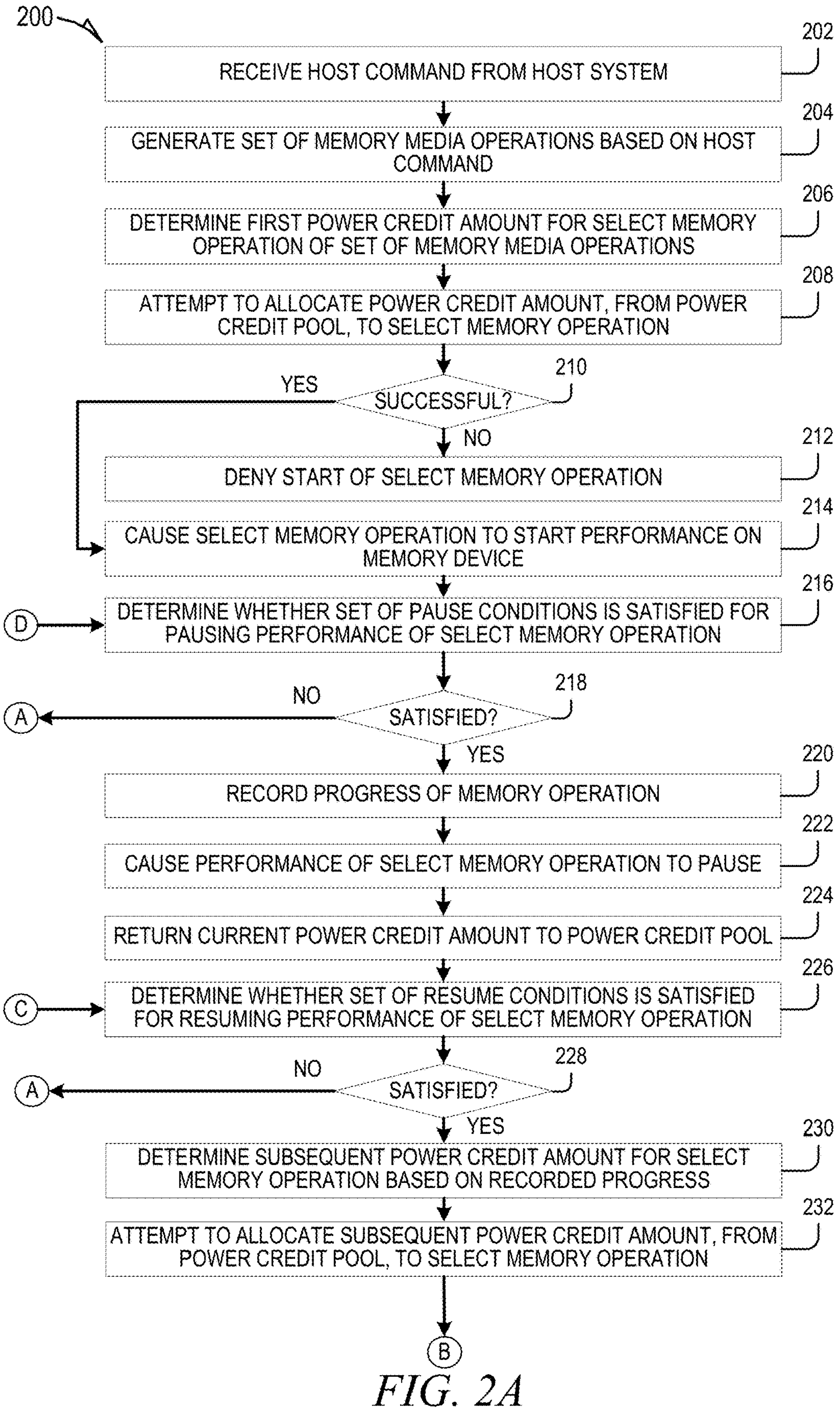
FIGS. 2A and 2B illustrate a flow diagram of an example method for incremental power throttling on a memory system using one or more power credit allocations and memory operation progress, in accordance with some embodiments of the present disclosure.
Figure 2B:
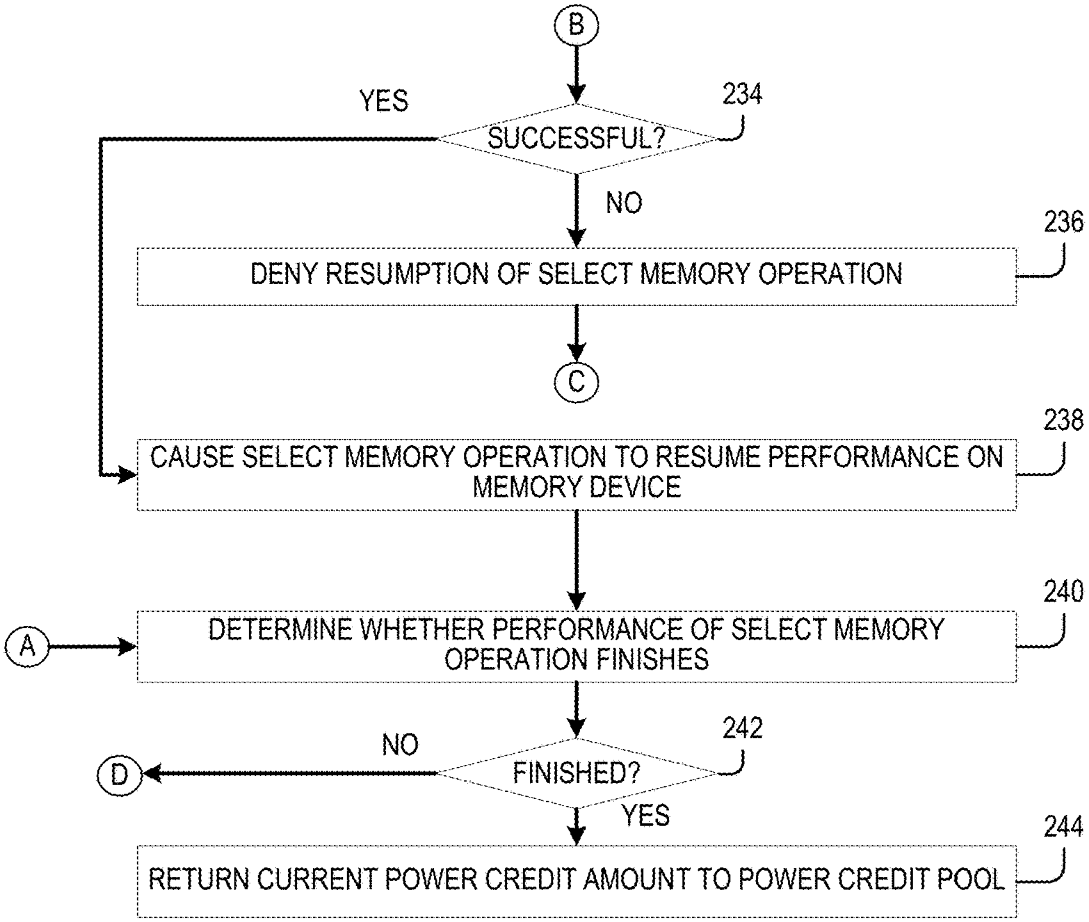

FIGS. 2A and 2B illustrate a flow diagram of an example method 200 for incremental power throttling on a memory system (e.g., memory sub-system) using one or more power credit allocations and memory operation progress, in accordance with some embodiments of the present disclosure. Method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 200 is performed by the memory sub-system controller 115 of FIG. 1 based on the incremental power throttler 113. Additionally, or alternatively, for some embodiments, method 200 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to method 200 of FIG. 2A, at operation 202, a processing device (e.g., the processor 117 of the memory sub-system controller 115) receives a host command from a host system (e.g., operatively coupled to the memory sub-system 110). During operation 204, the processing device (e.g., the processor 117) generates a set of memory operations (e.g., memory media operations) based on the host command received by operation 202. For some embodiments, at least one memory operation (e.g., select memory operation) in the set of memory operations is capable of being paused during performance (e.g., at one or more different points during performance) and subsequently resumed. For instance, a select memory operation in the set of memory operations comprises a multi-step operation, where the select memory operation can be paused between one or more different steps. For some embodiments, the select memory operation comprises at least one of a write operation or a read operation. Additionally, the set of memory operations can comprise one or more program operations, or one or more erase operations. At operation 206, the processing device (e.g., the processor 117) determines a first power credit amount for a select (e.g., first) memory operation of the set of memory operations. For various embodiments, the first power credit amount is determined based on the type of memory operation of the select memory operation. The first power credit amount determined can represent an amount of power credit sufficient to perform the select memory operation from start to finish. For various embodiments, the select memory operation comprises a write operation, and the power credit amount comprises a first portion of power credit associated with writing data to one or more lower pages (e.g., of a MLC, TLC, or QLC block) of the memory device, and a second portion of power credit associated with writing data to one or more upper pages (e.g., of a MLC, TLC, or QLC block) of the memory device. For various embodiments, the select memory operation comprises a write operation, and the power credit amount comprises a first portion of power credit associated with writing data to one or more lower pages (e.g., of a TLC, or QLC block) of the memory device, a second portion of power credit associated with writing data to one or more upper pages (e.g., of a TLC, or QLC block) of the memory device, and a third portion of power credit associated with writing data to one or more extra pages (e.g., of a TLC, or QLC block) of the memory device. Additionally, for various embodiments, the select memory operation comprises a write operation, and the power credit amount comprises a first portion of power credit associated with writing data to one or more lower pages (e.g., of a QLC block) of the memory device, a second portion of power credit associated with writing data to one or more upper pages (e.g., of a QLC block) of the memory device, a third portion of power credit associated with writing data to one or more extra pages (e.g., of a QLC block) of the memory device, and a fourth portion of power credit associated with writing data to one or more top pages (e.g., of a QLC block) of the memory device.

During operation 208, the processing device (e.g., the processor 117) attempts to allocate the first power credit amount, from a power credit pool (e.g., of the memory sub-system 110), to the select memory operation. For some embodiments, the power credit pool is finite, and starts with a finite number (e.g., a maximum value) of available power credits (e.g., starts with a predetermined numeric value), from which power credit amounts can be subtracted (e.g., during allocation to a memory operation) and to which added (e.g., during deallocation from a memory operation). The total or maximum amount of power credits initially available in the power credit pool can be determined, for example, using traditional methods of determining the amount. For example, when available power on the memory system is being throttled down, the amount can be lowered, and when available power on the memory system is not being throttled down, the amount can be restored to a default or originally determined value. For various embodiments, allocating a power credit amount from the power credit pool comprises subtracting the power credit amount from the power credit pool. For some embodiments, allocation of the first power credit amount to the select memory operation is successful: (a) if the power credit pool has a sufficient amount of power credits available to provide an allocation of the first power credit amount (e.g., determined by operation 206) to the select memory operation; (b) after the first power credit amount is subtracted from the power credit pool, and (c) after the first power credit amount is allocated to (e.g., assigned to or checked out for) the select memory operation. For some embodiments, the power credit pool, allocation of power credit amounts to different memory operations, or both, are maintained (e.g., tracked) in a data structure (e.g., data table) maintained by the memory system controller (e.g., the memory sub-system controller 115). If it is determined that allocation of the first power credit amount to the select memory operation is successful at decision point 210, method 200 proceeds to operation 214, otherwise method 200 proceeds to operation 212, where the start (of performance) of the select memory operation is denied.

At operation 214, the processing device (e.g., the processor 117) causes the select memory operation to start performance on a memory device (e.g., 130, 140) of the memory system (e.g., the memory sub-system 110). Eventually, at operation 216, the processing device (e.g., the processor 117) determines whether a set of pause conditions is satisfied for pausing performance of the select memory operation.

Operation 216 can be performed periodically while the select memory operation is being performed. For some embodiments, the set of pause conditions comprises receiving another memory operation that has a higher priority than the select memory operation being performed, that uses less power than the select memory operation, that can be executed in a shorter period of time than the select memory operation, or some combination thereof. For instance, the select memory operation can comprise a write operation and the other memory operation received can comprise a read operation. In another instance, the select memory operation can comprise a low-priority read operation, and the other memory operation received can comprise a high-priority read operation. If it is determined (by operation 216) that the set of pause conditions is satisfied at decision point 218, method 200 proceeds to operation 220, otherwise method 200 proceeds to operation 240.

At operation 220, the processing device (e.g., the processor 117) records a progress of the select memory operation, where the progress indicates how much of the select memory operation has been completed since performance of the select memory operation started (by operation 214). For instance, the processing device can record the progress of the select memory operation by storing or updating progress data (e.g., in a data structure maintained by the memory sub-system controller 115) to indicate the current progress of the select memory operation. Progress data for the select memory operation can be stored collectively with the progress data of one or more other memory operations that are currently being performed or currently paused. For some embodiments, the memory operation comprises at least one of a program operation and an erase operation, and the progress of the memory operation is determined based on a counter configured to track a number of pulses (e.g., voltage pulses for programming data or erasing data) performed during the memory operation. For some embodiments, the memory operation comprises at least one of a program operation and an erase operation, and the progress of the memory operation is determined based on an amount of time elapsed since performance of the memory operation started (e.g., by operation 214).

At operation 222, the processing device (e.g., the processor 117) causes performance of the select memory operation to pause. During operation 224, the processing device (e.g., the processor 117) returns a current power credit amount (e.g., the power credit amount last allocated to the select memory operation, which can be the first power credit amount if the select memory operation has yet to ever be paused) to the power credit pool. For some embodiments, returning the current power credit amount to the power credit pool comprises adding the current power credit amount to the power credit pool. Additionally, for some embodiments, returning the current power credit amount to the power credit pool comprises deallocating (e.g., unassigning or releasing) the current power credit amount from the select memory operation and the addition of the current power credit amount back to the power credit pool.

Eventually, at operation 226, the processing device (e.g., the processor 117) determines whether a set of resume conditions is satisfied for resuming performance of the (currently paused) select memory operation. Operation 226 can be performed periodically while the select memory operation is being performed. For some embodiments, where the select memory operation is paused in order to perform a higher-priority memory operation, the set of resume conditions comprises where the higher-priority memory operation finishes performance. For instance, the select memory operation can comprise a write operation, and the higher-priority memory operation that caused the pause can comprise a read operation. In another instance, the select memory operation can comprise a low-priority read operation, and the higher-priority memory operation that caused the pause can comprise a high-priority read operation. At decision point 228, if it is determined (by operation 226) that the set of resume conditions is satisfied, method 200 proceeds to operation 230, otherwise method 200 proceeds to operation 240.

During operation 230, the processing device (e.g., the processor 117) determines a subsequent power credit amount for the memory operation based on the recorded progress (recorded by operation 220). For various embodiments, the subsequent power credit amount determined by operation 230 is less than at least the first power credit amount allocated to the select memory operation and, depending on the recorded progress, can be less than the power credit amount last allocated to the select memory operation just prior to its last pause (e.g., the current power credit amount returned by operation 224). For some embodiments, the subsequent power credit amount is determined based on the first power credit (amount initially determined by operation 206). For instance, the recorded progress can indicate a percentage of the select memory operation that has been completed, and the subsequent power credit amount can be determined as a fraction or percentage of the first power credit, where the fraction/percentage is based on (e.g., relative to) the recorded progress. For example, the percentage value described by recorded progress can be subtracted from 100%, and the resulting percentage can be applied to (e.g., multiplied with) the first power credit amount to determine the subsequent power credit amount. For instance, if recorded progress indicates that the select memory operation is 30% completed when the select memory operation is paused, then the subsequent power credit amount allocated to the select memory operation (when the select memory operation is resumed) can comprise 70% of the first power credit amount. Based on the progress of the select memory operation, the subsequent power credit amount (e.g., the second, third, fourth, etc. power credit amount) is generally less than the first power credit amount.

Thereafter, at operation 232, the processing device (e.g., the processor 117) attempts to allocate the subsequent power credit amount (determined by operation 230), from the power credit pool, to the select memory operation. For some embodiments, allocation of the subsequent power credit amount to the select memory operation is successful: (a) if the power credit pool has a sufficient amount of power credits available to provide an allocation of the subsequent power credit amount (e.g., determined by operation 206) to the select memory operation; (b) after the subsequent power credit amount is subtracted from the power credit pool, and (c) after the subsequent power credit amount is allocated to (e.g., assigned to or checked out for) the select memory operation. Referring now to FIG. 2B, if it is determined (by operation 232) that allocation of the subsequent power credit amount to the select memory operation is successful at decision point 234, method 200 proceeds to operation 238, otherwise method 200 proceeds to operation 236, where the resumption (of performance) of the select memory operation is denied. After operation 236, method 200 returns to operation 226, where the processing device redetermines whether the set of resume conditions is satisfied for resuming performance of the (currently paused) select memory operation.

At operation 238, the processing device (e.g., the processor 117) causes the memory operation to resume performance on the memory device (e.g., 130, 140). After operation 238, method 200 proceeds to operation 240.

At operation 240, the processing device (e.g., the processor 117) determines whether performance of the select memory operation is finished (or completed). Operation 240 can be performed periodically while the select memory operation is being performed. If it is determined (by operation 240) that performance of the select memory operation is finished at decision point 242, method 200 proceeds to operation 244, otherwise method 200 proceeds to operation 216, where the processing device redetermines whether the set of pause conditions is satisfied for pausing performance of the select memory operation (which is currently performing/running).

At operation 244, the processing device (e.g., the processor 117) returns the current power credit amount (e.g., the power credit amount last allocated to the select memory operation, which can be the first power credit amount if the select memory operation has yet to ever be paused) to the power credit pool.

For various embodiments, one or more of operations 216, 226, 240 are performed as part of a (e.g., background) monitoring process that periodically determines (e.g., checks) the condition or status of a memory operation that started performance by operation 214.

Figure 3:
FIG. 3 is a diagram illustrating an example timeline of using one or more power credit allocations and memory operation progress to incrementally throttle power on a memory system, in accordance with some embodiments of the present disclosure.

FIG. 3 is a diagram illustrating an example timeline 300 of using one or more power credit allocations and memory operation progress to incrementally throttle power on a memory system (e.g., memory sub-system), in accordance with some embodiments of the present disclosure. In FIG. 3, a select memory operation (e.g., write operation) starts performing (310) and is eventually paused (312) to perform a first interrupting memory operation 304 (e.g., read operation), the select memory operation resumes performance (320) after the first interrupting memory operation 304 completes, the select memory operation is eventually paused (322) to perform a second interrupting memory operation 306 (e.g., another read operation), the select memory operation resumes performance (330) after the second interrupting memory operation 306 completes, and the select memory operation eventually finishes 332. One or both of the first interrupting memory operation 304 and the second interrupting memory operation 306 can represent a memory operation that has a higher priority than the select memory operation being performed, that uses less power than the select memory operation, that can be executed in a shorter period of time than the select memory operation, or some combination thereof.

According to some embodiments, a first power credit amount is allocated to (e.g., assigned to or checked out for) the select memory operation (from a power credit pool) at or before the select memory operation starts performing (310), and the first power credit amount is deallocated (e.g., unassigned or released) from the select memory operation and returned (e.g., checked-in) to the power credit pool at or after the select memory operation is paused (312) for performance of the first interrupting memory operation 304. For some embodiments, the second power credit amount is allocated to (e.g., assigned to or checked out for) the select memory operation (from the power credit pool) at or before the select memory operation resumes performing (320), and the second power credit amount is deallocated (e.g., unassigned or released) from the select memory operation and returned (e.g., checked-in) to the power credit pool at or after the select memory operation is paused (322) for performance of the second interrupting memory operation 306. For some embodiments, the third power credit amount is allocated to (e.g., assigned to or checked out for) the select memory operation (from the power credit pool) at or before the select memory operation resumes performing (330), and the third power credit amount is deallocated (e.g., unassigned or released) from the select memory operation and returned (e.g., checked in) to the power credit pool at or after the select memory operation is finished (332).

For various embodiments, the first power credit amount is determined based on the type of memory operation of the select memory operation, and represents the power consumption for performing the select memory operation from start to finish. The second power credit amount can be determined based on the progress of the select memory operation by the time the select memory operation is paused (312), and the third power credit amount can be determined based on the progress of the select memory operation by the time the select memory operation is paused (322). For example, the first power credit amount can comprise 10 power credits and can represent 100% of the possible power credit amount allocated to the select memory operation based on its memory operation type (e.g., write operation). Where the select memory operation is 20% complete by the time the select memory operation pauses (312) for performing the first interrupting memory operation 304, the second power credit amount allocated to the select memory operation when the select memory operation resumes (320) after the first interrupting memory operation 304 finishes can be 80% of the first power credit power. Where the select memory operation is 60% complete by the time the select memory operation pauses (322) for performing the second interrupting memory operation 306, the third power credit amount allocated to the select memory operation when the select memory operation resumes (330) after the second interrupting memory operation 306 finishes can be 40% of the first power credit power.

Figure 4:
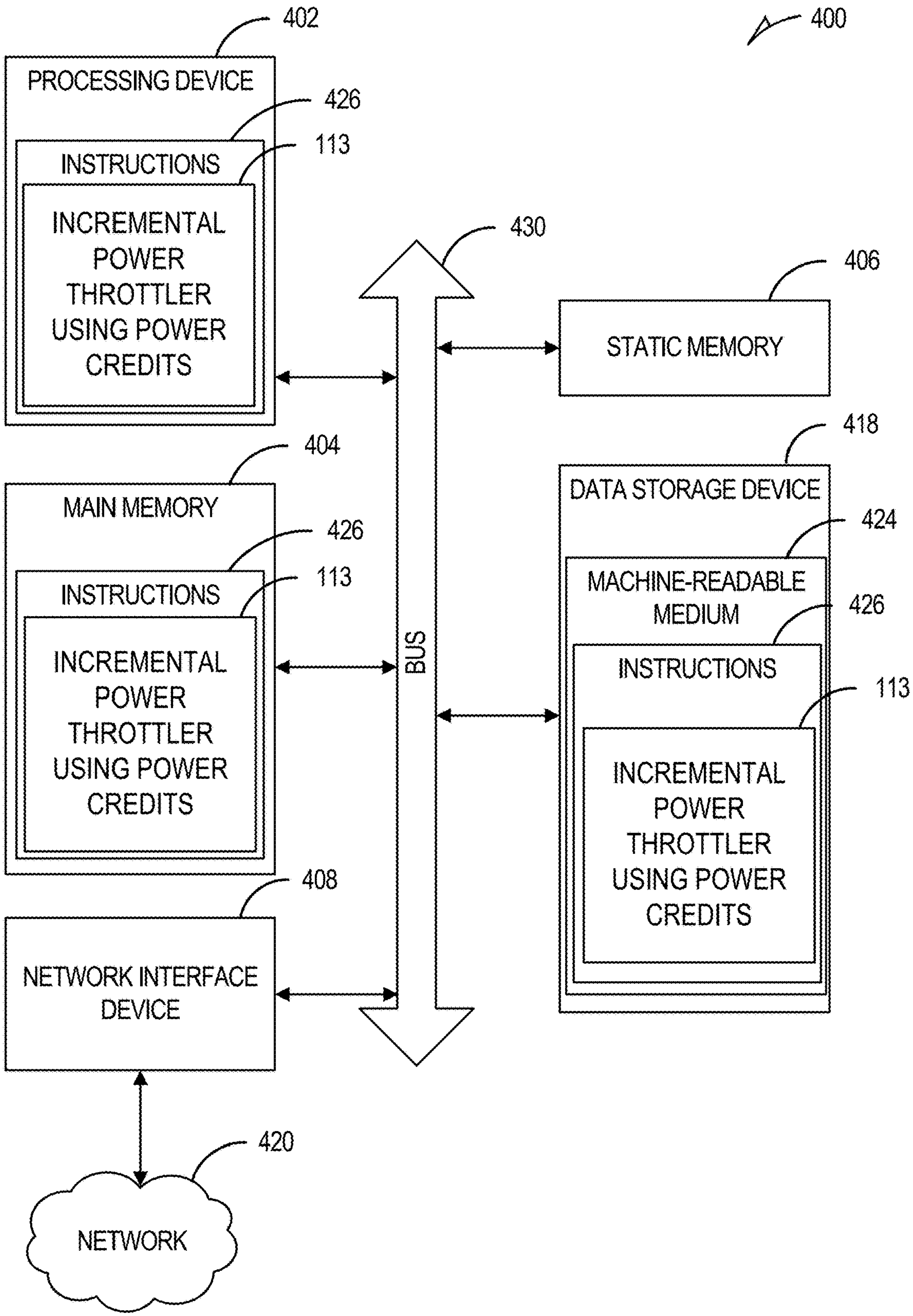
FIG. 4 is a block diagram of an example computer system in which embodiments of the present disclosure may operate.

FIG. 4 illustrates an example machine in the form of a computer system 400 within which a set of instructions can be executed for causing the machine to perform any one or more of the methodologies discussed herein. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., ROM, flash memory, DRAM such as SDRAM or Rambus DRAM (RDRAM), etc.), a static memory 406 (e.g., flash memory, static random access memory (SRAM), etc.), and a data storage device 418, which communicate with each other via a bus 430.

The processing device 402 represents one or more general-purpose processing devices such as a microprocessor, a central processing unit, or the like. More particularly, the processing device 402 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 402 can also be one or more special-purpose processing devices such as an application-specific integrated circuit (ASIC), a field programmable gate array (FPGA), a digital signal processor (DSP), a network processor, or the like. The processing device 402 is configured to execute instructions 426 for performing the operations and steps discussed herein. The computer system 400 can further include a network interface device 408 to communicate over a network 420.

The data storage device 418 can include a machine-readable storage medium 424 (also known as a computer-readable medium) on which is stored one or more sets of instructions 426 or software embodying any one or more of the methodologies or functions described herein. For some embodiments, the machine-readable storage medium 424 is a non-transitory machine-readable storage medium. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage device 418, and/or main memory 404 can correspond to the memory sub-system 110 of FIG. 1.

In one embodiment, the instructions 426 include instructions to implement functionality corresponding to incremental power throttling on a memory system as described herein (e.g., the incremental power throttler 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (e.g., non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled to the memory device, configured to perform operations comprising:

while a memory operation is being performed on the memory device, determining whether a set of pause conditions is satisfied for pausing performance of the memory operation, the memory operation having a first power credit amount allocated from a power credit pool of the system;

in response to determining that the set of pause conditions is satisfied:

recording a progress of the memory operation, the progress indicating how much of the memory operation has been completed since performance of the memory operation started;

causing performance of the memory operation to pause; and returning the first power credit amount to the power credit pool; and determining, based on the recorded progress, a second power credit amount for the memory operation when the memory operation is subsequently resumed, the second power credit amount being less than the first power credit amount.

2. The system of claim 1, wherein the operations comprise:

after the memory operation is paused, determining whether a set of resume conditions is satisfied for resuming performance of the memory operation, the determining of the second power credit amount being performed in response to determining that the set of resume conditions is satisfied; and in response to determining that the set of resume conditions is satisfied:

attempting to allocate the second power credit amount, from the power credit pool, to the memory operation; and in response to allocation of the second power credit amount to the memory operation being successful, causing the memory operation to resume performance on the memory device.

3. The system of claim 1, wherein the operations comprise, prior to the determining of whether the set of pause conditions is satisfied:

receiving a request to perform the memory operation on the memory device; and in response to the request:

determining the first power credit amount for the memory operation;

attempting to allocate the first power credit amount, from the power credit pool, to the memory operation; and in response to allocation of the first power credit amount to the memory operation being successful, causing the memory operation to start performance on the memory device.

4. The system of claim 1, wherein the memory operation comprises at least one of a program operation and an erase operation.

5. The system of claim 4, wherein the progress of the memory operation is determined based on a counter configured to track a number of pulses performed during the memory operation.

6. The system of claim 4, wherein the progress of the memory operation is determined based on an amount of time elapsed since performance of the memory operation started.

7. The system of claim 1, wherein the memory operation is a write operation.

8. The system of claim 7, wherein the first power credit amount comprises:

a first portion of power credit associated with writing data to one or more lower pages of the memory device; and a second portion of power credit associated with writing data to one or more upper pages of the memory device.

9. The system of claim 1, wherein the memory operation is a read operation.

10. The system of claim 9, wherein the system is a memory sub-system, and wherein the first power credit amount comprises:

a first portion of power credit associated with reading data from the memory device; and a second portion of power credit associated with transferring read data to a host system operatively coupled to the memory sub-system.

11. The system of claim 1, wherein the memory operation is a first memory operation, and wherein the set of pause conditions comprises receiving a second memory operation.

12. The system of claim 11, wherein the second memory operation is a read operation.

13. The system of claim 1, wherein the power credit pool starts with a finite number of available power credits.

14. The system of claim 1, wherein allocating the first power credit amount from the power credit pool comprises subtracting the first power credit amount from the power credit pool.

15. The system of claim 1, wherein returning the first power credit amount to the power credit pool comprises adding the first power credit amount to the power credit pool.

16. The system of claim 1, wherein the system is a memory sub-system operatively coupled to a host system, wherein a set of memory media operations is generated based on a host command received from the host system, wherein the set of memory media operations is configured to operate on a set of memory media on the memory device, and wherein the memory operation is a memory media operation included in the set of memory media operations.

17. The system of claim 16, wherein the set of memory media comprises a set of NOT-AND (NAND)-type memory media.

18. At least one non-transitory machine-readable storage medium comprising instructions that, when executed by a processing device of a memory sub-system, cause the processing device to perform operations comprising:

while a memory operation is being performed on a memory device of the memory sub-system, determining whether a set of pause conditions is satisfied for pausing performance of the memory operation, the memory operation having a first power credit amount allocated from a power credit pool of the memory sub-system;

in response to determining that the set of pause conditions is satisfied:

recording a progress of the memory operation, the progress indicating how much of the memory operation has been completed since performance of the memory operation started;

causing performance of the memory operation to pause; and returning the first power credit amount to the power credit pool; and determining, based on the recorded progress, a second power credit amount for the memory operation when the memory operation is subsequently resumed, the second power credit amount being less than the first power credit amount.

19. The at least one non-transitory machine-readable storage medium of claim 18, wherein the operations comprise:

after the memory operation is paused, determining whether a set of resume conditions is satisfied for resuming performance of the memory operation, the determining of the second power credit amount being performed in response to determining that the set of resume conditions is satisfied; and in response to determining that the set of resume conditions is satisfied:

attempting to allocate the second power credit amount, from the power credit pool, to the memory operation; and in response to allocation of the second power credit amount to the memory operation being successful, causing the memory operation to resume performance on the memory device.

20. A method comprising:

receiving, at a memory sub-system, a host command from a host system operatively coupled to the memory sub-system;

generating, by a processing device of the memory sub-system, a set of memory media operations based on the host command;

determining, by the processing device, a first power credit amount for a first memory media operation of the set of memory media operations;

attempting, by the processing device, to allocate the first power credit amount, from a power credit pool of the memory sub-system, to the first memory media operation;

determining that allocation of the first power credit amount to the first memory media operation is successful;

in response to the allocation of the first power credit amount to the first memory media operation being successful, causing, by the processing device, the first memory media operation to start performance on a memory device of the memory sub-system;

determining, by the processing device, that a set of pause conditions is satisfied for pausing performance of the first memory media operation;

in response to determining that the set of pause conditions is satisfied:

recording, by the processing device, a progress of the first memory media operation, the progress indicating how much of the first memory media operation has been completed since performance of the first memory media operation started;

causing, by the processing device, performance of the first memory media operation to pause; and returning, by the processing device, the first power credit amount to the power credit pool;

determining that the memory operation is subsequently resumed; and determining, based on the recorded progress, a second power credit amount for the memory operation in response to determining that the memory operation is subsequently resumed, the second power credit amount being less than the first power credit amount.

* * * * *